United States Patent
Parkinson et al.

(10) Patent No.: US 9,760,584 B2
(45) Date of Patent: *Sep. 12, 2017

(54) SYSTEMS AND METHODS FOR SUPPORTING INLINE DELEGATION OF MIDDLE-TIER TRANSACTION LOGS TO DATABASE

(71) Applicant: Oracle International Corporation, Redwood Shores, CA (US)

(72) Inventors: Paul Parkinson, Orlando, FL (US); Todd J. Little, Palatine, IL (US); Stefan Heinrich Roesch, Redwood Shores, CA (US); Carol Lyndall Colrain, Redwood Shores, CA (US); Edward Heeren, Berkeley Heights, NJ (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/828,490

(22) Filed: Mar. 14, 2013

(65) Prior Publication Data

US 2013/0246368 A1 Sep. 19, 2013

Related U.S. Application Data

(60) Provisional application No. 61/612,144, filed on Mar. 16, 2012, provisional application No. 61/774,356, filed on Mar. 7, 2013.

(51) Int. Cl.
*G06F 17/00* (2006.01)
*G06F 7/00* (2006.01)
(Continued)

(52) U.S. Cl.
CPC ........ *G06F 17/30289* (2013.01); *G06F 9/466* (2013.01); *G06F 11/0709* (2013.01); *G06F 11/1474* (2013.01)

(58) Field of Classification Search
CPC ............... G06F 17/30289; G06F 9/466; G06F 11/1474; G06F 11/0709
(Continued)

(56) References Cited

U.S. PATENT DOCUMENTS

| | | |
|---|---|---|
| 5,261,089 A | 11/1993 | Coleman et al. |
| 5,452,445 A | 9/1995 | Hallmark et al. |

(Continued)

FOREIGN PATENT DOCUMENTS

| | | |
|---|---|---|
| CN | 101438248 A | 5/2009 |
| CN | 102203779 A | 9/2011 |
| CN | 102317913 A | 1/2012 |

OTHER PUBLICATIONS

IBM, IBM DB2 Universal Database—Administration Guide: Planning, Version 8, Jan. 1, 2002, 49 pages.

(Continued)

*Primary Examiner* — Md. I Uddin
(74) *Attorney, Agent, or Firm* — Tucker Ellis LLP

(57) ABSTRACT

Systems and methods are provided for supporting transaction recovery based on inline delegation of transaction logs to a database. The system can retrieve transaction recovery information of a transaction from a persistence store, wherein the transaction recovery information is persisted on a resource manager that is associated with the persistence store during a prepare phase. Furthermore, the system can retrieve one or more in-doubt transactions from one or more participating resource managers of the transaction. Then, the system can determine whether to commit or roll back the one or more in-doubt transactions by matching the one or more (Continued)

in-doubt transactions to the transaction recovery information.

20 Claims, 7 Drawing Sheets

(51) Int. Cl.
*G06F 17/30* (2006.01)
*G06F 9/46* (2006.01)
*G06F 11/07* (2006.01)
*G06F 11/14* (2006.01)

(58) Field of Classification Search
USPC ........ 707/611, 674, 703, 752, 615, 684, 678
See application file for complete search history.

(56) References Cited

U.S. PATENT DOCUMENTS

| | | | |
|---|---|---|---|
| 5,555,396 | A | 9/1996 | Alferness et al. |
| 5,617,537 | A | 4/1997 | Yamada et al. |
| 5,652,885 | A | 7/1997 | Reed |
| 5,680,610 | A | 10/1997 | Smith |
| 5,790,789 | A | 8/1998 | Suarez |
| 6,070,202 | A | 5/2000 | Minkoff et al. |
| 6,154,847 | A | 11/2000 | Schofield et al. |
| 6,247,023 | B1 | 6/2001 | Hsiao et al. |
| 6,374,243 | B1 | 4/2002 | Kobayashi |
| 6,470,342 | B1 | 10/2002 | Gondi et al. |
| 6,629,153 | B1 | 9/2003 | Gupta |
| 6,754,842 | B2 | 6/2004 | Kettley et al. |
| 7,103,597 | B2 | 9/2006 | McGoveran |
| 7,284,018 | B1 | 10/2007 | Waldorf et al. |
| 7,380,155 | B2 | 5/2008 | Fung et al. |
| 7,430,740 | B1 | 9/2008 | Molloy et al. |
| 7,600,002 | B2 * | 10/2009 | Pavlik ................... H04L 67/02 709/203 |
| 7,694,178 | B2 | 4/2010 | Hobson |
| 7,725,446 | B2 | 5/2010 | Huras |
| 7,743,036 | B2 | 6/2010 | Cotner et al. |
| 7,822,727 | B1 | 10/2010 | Shaughnessy |
| 7,913,261 | B2 | 3/2011 | Mitchell |
| 7,970,737 | B2 | 6/2011 | Parkinson |
| 8,671,085 | B2 | 3/2014 | Dhamankar et al. |
| 8,738,964 | B2 | 5/2014 | Markus |
| 8,868,506 | B1 | 10/2014 | Bhargava et al. |
| 9,146,944 | B2 | 9/2015 | Parkinson |
| 2001/0047436 | A1 | 11/2001 | Sexton et al. |
| 2002/0023129 | A1 | 2/2002 | Hsiao et al. |
| 2002/0116568 | A1 | 8/2002 | Oksanen |
| 2002/0144006 | A1 | 10/2002 | Cranston |
| 2003/0005172 | A1 | 1/2003 | Chessell |
| 2003/0035372 | A1 | 2/2003 | Schaub |
| 2003/0154423 | A1* | 8/2003 | Egolf .................. G06F 11/1474 714/15 |
| 2004/0015079 | A1 | 1/2004 | Berger |
| 2004/0123293 | A1 | 6/2004 | Johnson |
| 2004/0153349 | A1 | 8/2004 | K et al. |
| 2004/0153450 | A1 | 8/2004 | K et al. |
| 2004/0158549 | A1 | 8/2004 | Matena et al. |
| 2005/0044551 | A1 | 2/2005 | Sodhi |
| 2005/0144171 | A1 | 6/2005 | Robinson |
| 2005/0144299 | A1* | 6/2005 | Blevins ............. G06F 17/30595 709/230 |
| 2005/0182795 | A1* | 8/2005 | Murthy ............. G06F 17/30575 |
| 2005/0262055 | A1 | 11/2005 | Newport |
| 2005/0262077 | A1 | 11/2005 | Barnes |
| 2006/0010026 | A1 | 1/2006 | Nenov |
| 2006/0075277 | A1 | 4/2006 | Johnson et al. |
| 2006/0080668 | A1 | 4/2006 | Blackmore et al. |
| 2006/0136887 | A1 | 6/2006 | Kaczynski et al. |
| 2006/0149791 | A1 | 7/2006 | Sinha et al. |
| 2006/0179125 | A1 | 8/2006 | Pavlik et al. |
| 2006/0235853 | A1 | 10/2006 | Luo |
| 2007/0041392 | A1 | 2/2007 | Kunze et al. |
| 2007/0079077 | A1 | 4/2007 | Baines et al. |
| 2007/0156729 | A1 | 7/2007 | Shaylor |
| 2007/0165625 | A1 | 7/2007 | Eisner |
| 2008/0127219 | A1 | 5/2008 | Lacombe et al. |
| 2008/0147945 | A1 | 6/2008 | Zimmer |
| 2008/0177955 | A1 | 7/2008 | Su |
| 2008/0246865 | A1 | 10/2008 | Hashimoto |
| 2008/0250074 | A1 | 10/2008 | Parkinson |
| 2009/0070330 | A1 | 3/2009 | Hwang et al. |
| 2009/0158397 | A1 | 6/2009 | Herzog et al. |
| 2009/0172153 | A1 | 7/2009 | Cohen |
| 2009/0248765 | A1 | 10/2009 | Akidau et al. |
| 2009/0292744 | A1 | 11/2009 | Matsumura |
| 2010/0042999 | A1 | 2/2010 | Dorai et al. |
| 2010/0169284 | A1 | 7/2010 | Walter et al. |
| 2010/0198920 | A1 | 8/2010 | Wong et al. |
| 2011/0055313 | A1 | 3/2011 | Little |
| 2011/0087633 | A1 | 4/2011 | Kreuder et al. |
| 2011/0145204 | A1 | 6/2011 | Maple et al. |
| 2012/0084274 | A1 | 4/2012 | Renkes et al. |
| 2012/0131285 | A1 | 5/2012 | Leshchiner et al. |
| 2012/0166889 | A1 | 6/2012 | El-Kersh et al. |
| 2012/0210094 | A1 | 8/2012 | Blocksome et al. |
| 2013/0066949 | A1 | 3/2013 | Colrain |

OTHER PUBLICATIONS

International Searching Authority, International Search Report and Written Opinion for PCT International Patent Application No. PCT/US2013/032444, Jul. 5, 2013, 11 pages.
International Searching Authority, International Search Report and Written Opinion for PCT International Patent Application No. PCT/US2013/032473, Jul. 5, 2013, 12 pages.
State Intellectual Property Office of the People's Republic of China, Office Action Dated Dec. 23, 2016 for Chinese Patent Application No. 201380008047.6, 10 Pages.
State Intellectual Property Office of the People's Republic of China, Office Action Dated Dec. 26, 2016 for Chinese Patent Application No. 201380008052.7, 12 Pages.
IBM, IBM® DB2 Universal Database™ Administration Guide: Performance Version 8, © Copyright International Business Machines Corporation 1993-2002, Entire Book. download on Jan. 20, 2017 from: <ftp://ftp.software.ibm.com/ps/products/db2/info/vr8/pdf/letter/db2d3e80.pdf>.
-Iirotaka Taruzawa, Takakiyo Tanaka, Aim! J2EE Architect Mission Critical Systems Development Course, Monthly Java World, Japan, Tokyo: IDG Japan, Apr. 1, 2005, vol. 9 No. 4 (Serial No. 95), pp. 130-141.
Yoshihiro Iwamiya, Shigeru Urushibara, 3. Art to Support Distributed Transaction Processing, Basic Knowledge 4 for SE, Distributed-Transaction Processing 1st Edition, Tokyo : Co. Ltd. RIC Telecom, Apr. 20, 1994, 1st Edition, pp. 84-91, 228, 262-263, ISBN4-89797-056-3.
United States Patent and Trademark Office, Office Action dated July 24, 2017 for U.S. Appl. No. 13/829,246, 45 pages.

* cited by examiner

SYSTEMS AND METHODS FOR SUPPORTING INLINE DELEGATION OF MIDDLE-TIER TRANSACTION LOGS TO DATABASE

CLAIM OF PRIORITY

This application claims priority on U.S. Provisional Patent Application No. 61/612,144, entitled "SYSTEM AND METHOD FOR PROVIDING DISTRIBUTED TRANSACTION PROCESSOR DATABASE AFFINITY AND DISTRIBUTED TRANSACTION PROCESS OPTIMIZATION," by inventors Todd Little, Edward A. Heeren, Paul Parkinson, Carol L. Colrain, Nancy Ikeda, Peizhi Shi, Right Lv, Jim Jin and Xugang Shen, filed Mar. 16, 2012, and U.S. Provisional Patent Application No. 61/774,356, entitled "SYSTEMS AND METHODS FOR SUPPORTING TRANSACTION RECOVERY WITHOUT TRANSACTION LOGS (TLOGS)," by inventors Paul Parkinson, Todd J. Little, Stefan Heinrich Roesch, Carol L. Colrain, Edward A. Heeren, filed Mar. 7, 2013, which applications are herein incorporated by reference.

CROSS REFERENCE TO RELATED APPLICATIONS

This application is related to the following patent application, which is hereby incorporated by reference in its entirety:

U.S. patent application titled "SYSTEMS AND METHODS FOR SUPPORTING TRANSACTION RECOVERY BASED ON A STRICT ORDERING OF TWO-PHASE COMMIT CALLS", application Ser. No. 13/828,590, filed Mar. 14, 2013 now U.S. Pat. No. 9,146,944 issued Sep. 29, 2015.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to transactional middleware.

BACKGROUND

A transactional middleware system, or transaction oriented middleware, includes enterprise application servers that can process various transactions within an organization. With the developments in new technologies such as high performance network and multiprocessor computers, there is a need to further improve the performance of transactional middleware. These are the generally areas that embodiments of the invention are intended to address.

SUMMARY

Systems and methods are provided for supporting transaction recovery based on inline delegation of transaction logs to a database. The system can retrieve transaction recovery information of a transaction from a persistence store, wherein the transaction recovery information is persisted on a resource manager that is associated with the persistence store during a prepare phase. Furthermore, the system can retrieve one or more in-doubt transactions from one or more participating resource managers of the transaction. Then, the system can determine whether to commit or roll back the one or more in-doubt transactions by matching the one or more in-doubt transactions to the transaction recovery information.

Other objects and advantages of the present invention will become apparent to those skilled in the art from the following detailed description of the various embodiments, when read in light of the accompanying drawings.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Tuxedo environment as an example for a transactional middleware machine environment. It will be apparent to those skilled in the art that other types of transactional middleware machine environments can be used without limitation.

Described herein are systems and methods for supporting supporting transaction recovery based on inline delegation of transaction logs to a database. The system can retrieve transaction recovery information of a transaction from a persistence store, wherein the transaction recovery information is persisted on a resource manager that is associated with the persistence store during a prepare phase. Furthermore, the system can retrieve one or more in-doubt transactions from one or more participating resource managers of the transaction. Then, the system can determine whether to commit or roll back the one or more in-doubt transactions by matching the one or more in-doubt transactions to the transaction recovery information.

A Transactional Environment and Global Transaction

Figure 1:
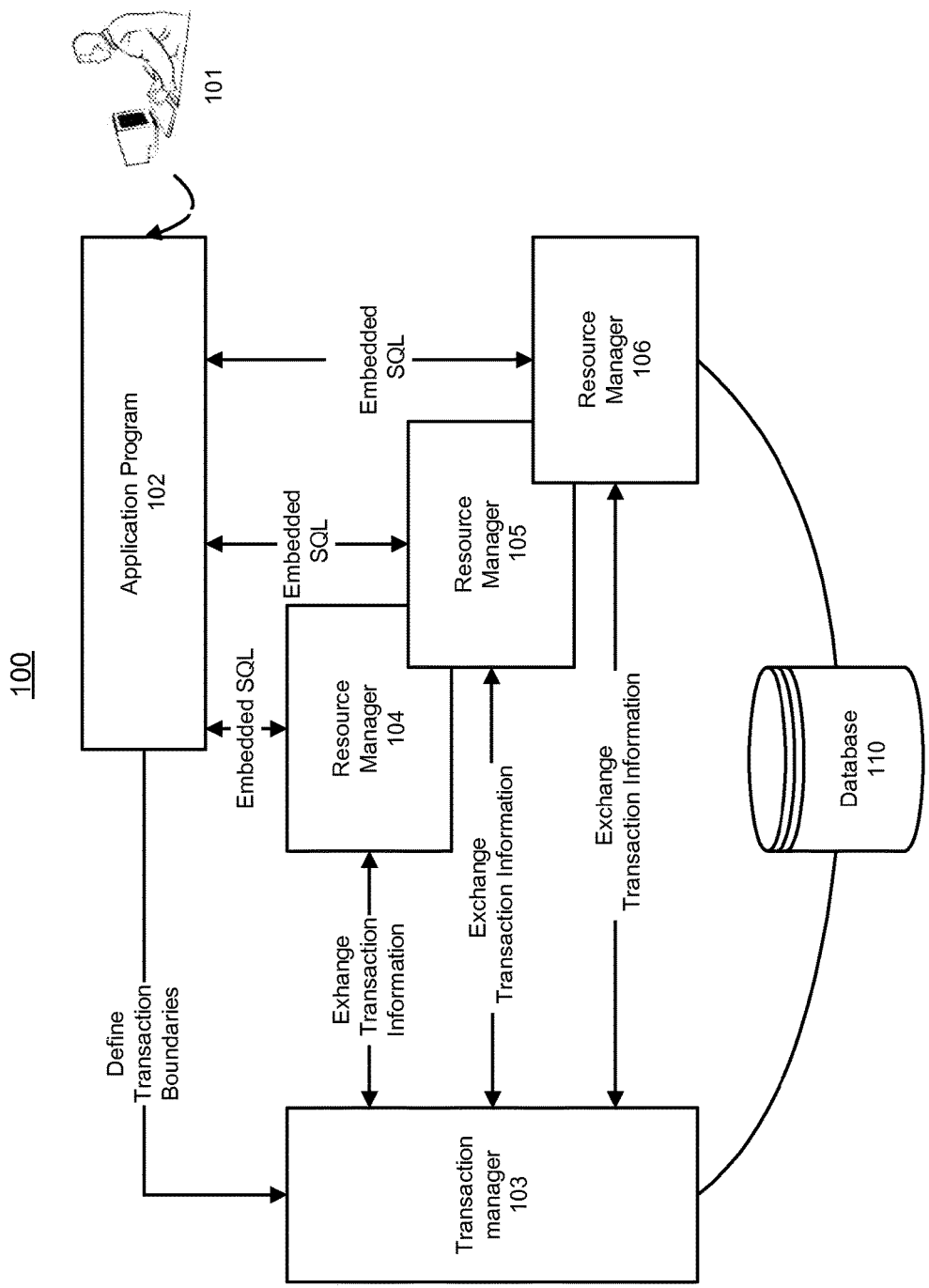
FIG. 1 shows an illustration of a transactional environment, in accordance with an embodiment of the invention.

FIG. 1 shows an illustration of a transactional environment, in accordance with an embodiment of the invention. As shown in FIG. 1, a transactional environment 100 can include an end user 101, an application program 102, one or more transaction managers (TM) 103, a plurality of resource managers (RM) 104-106, and one or more persistence stores, e.g. the database 110.

In accordance with one embodiment of the invention, the application program 102 can specify actions that constitute a transaction. As illustrated, the application program 102 communicates with the transaction manager 103 to begin, commit, or abort a transaction, and the transaction manager 103 can send back the start, end and disposition of the transaction to the application program 102. Furthermore, the application program 102 can define transaction boundaries for the transaction manager 103, which can exchange transaction information with the plurality of resource managers (RM) 104-106. In addition, the application program 102 can communicate with the plurality of resource managers 104-106 via Embedded Structured Query (SQL) to do useful work.

The plurality of resource managers 104-106 can provide access to persistence stores, e.g. the database 110. In accordance with an embodiment of the invention, the plurality of resource managers 104-106 can implement XA interfaces to handle database connections and disconnections transparently to persistence stores. The XA interfaces can be based on a specification that describes the protocol for transaction coordination, commitment, and recovery. An XA resource participating in a transaction can comprise an XA resource manager and a backend persistence store.

In accordance with various embodiments of the invention, a transactional system can support a global transaction, which can be executed on more than one server, and is capable of accessing data from more than one resource manager.

A global transaction can be treated as a specific sequence of operations that are characterized by the four properties of atomicity, consistency, isolation, and durability (ACID). The global transaction can be a logical unit of work that has the following features:

All portions either succeed or have no effect.
Operations are performed that correctly transform the resources from one consistent state to another.
Intermediate results are not accessible to other transactions, although other processes in the same transaction may access the data.
All effects of a completed sequence cannot be altered by any kind of failure.

Furthermore, a global transaction may include several local transactions, each accessing a single resource manager. A local transaction can access a single database or file and can be controlled by the resource manager responsible for performing concurrency control and atomicity of updates at that distinct database. A given local transaction may be either successful or unsuccessful in completing its access.

Additionally, the transaction manager 103 can assign global transaction identifiers (GTRIDs) to the different transactions in transactional environment 100. The transaction manager 103 can monitor their progress, and take responsibility for ensuring transaction completion and providing failure recovery. In addition, the transaction manager 103 can communicate with the plurality of resource managers 104-105 via XA interfaces to exchange transaction information, such as sending two-phase commits calls to the resource managers 104-105.

Two-phase Commit (2PC)

A two-phase-commit (2PC) protocol can be used to execute a transaction, such as a loosely-coupled global transaction. The two-phase-commit protocol (2PC) can include a prepare phase and a commit phase. In the prepare phase, a coordinating transaction manager (TM) instructs the participating resource managers (RMs) to take the necessary steps for either committing or aborting the transaction. In the commit phase, the transaction manager (TM) decides whether to commit or abort the transaction, based on the results of the prepare phase.

Figure 2:
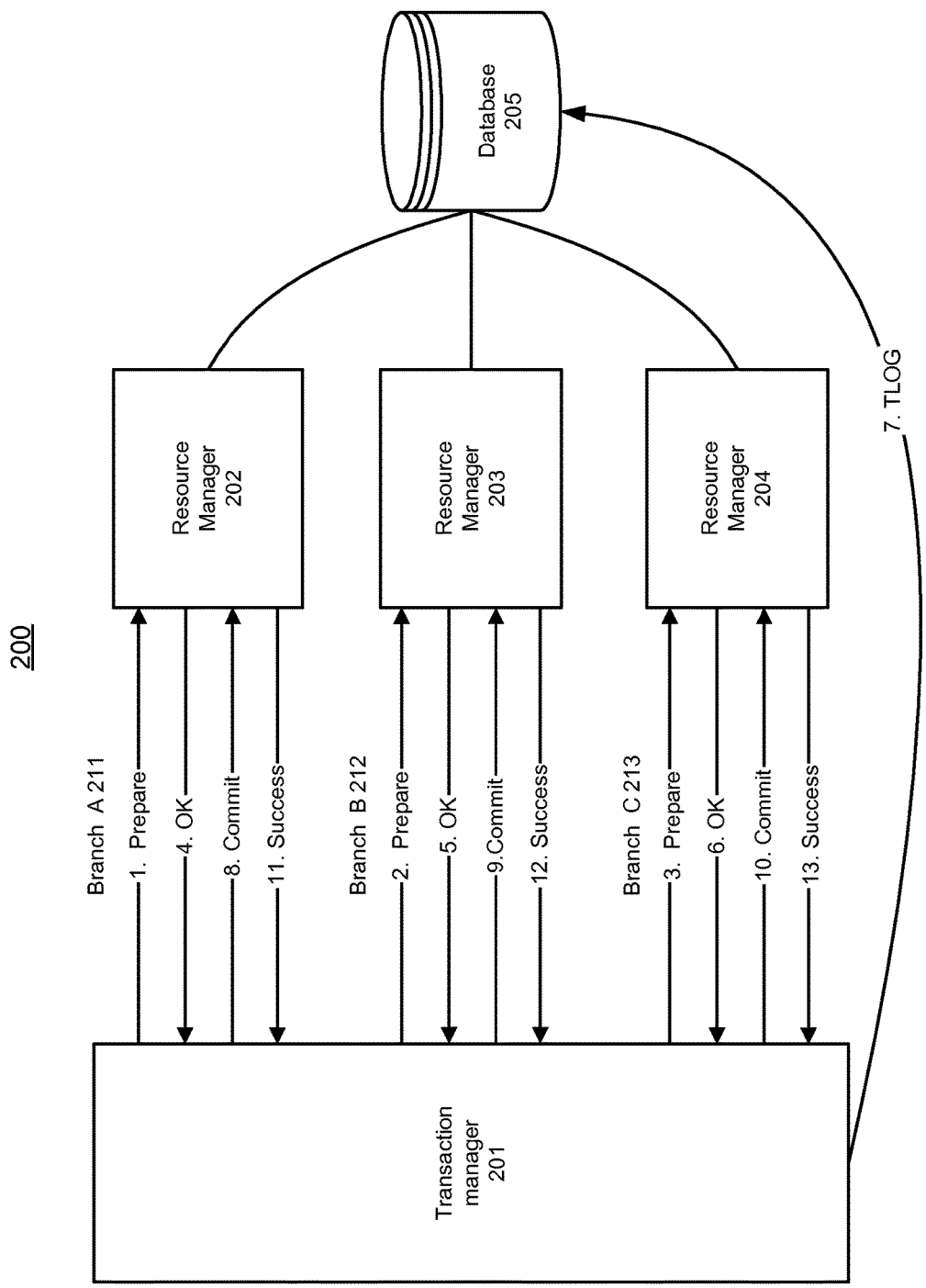
FIG. 2 shows an illustration of supporting two-phase commit in a transactional middleware machine environment.

FIG. 2 shows an illustration of supporting two-phase commit in a transactional middleware machine environment. As shown in FIG. 2, a transactional environment 200 can include a transaction manager 201 that supports the execution of various transactions, and one or more resource managers 202-204 that manage one or more data source, e.g. a database 205.

For example, the transaction manager 201 can execute a transaction that involves transaction branch A 211, transaction branch B 212, and transaction branch C 213, each of which can be executed against a resource manager 202-204 respectively. If any branch fails in the transaction, the transaction manager 201 can help the resource manager 202-204 decide whether to commit, or roll back, the transaction.

As shown in FIG. 2, the transaction manager 201 can send a prepare instruction to the resource manager 202-204 on all three branches (steps 1, 2, and 3). After the resource managers 202-204 return an "OK" vote (steps 4, 5 and 6), the transaction manager 201 can write a transaction log to the database 205 (step 7).

The transaction log (TLOG) may be written either to files, or to a database, so that the transaction manager 201 can have enough information to recover the transaction if any branch fails during the commit phase.

Then, the transaction manager 201 can instruct the resource manager 202-204 to commit all three branches (steps 8, 9 and 10). The resource manager 202-204 can inform the transaction manager 201 after successfully completing the commit phase (steps 11, 12 and 13).

Transaction Recovery Based on a Transaction Log (TLOG)

In accordance with one embodiment of the invention, a transaction log (TLOG) can hold the decisions for committing transactions by a transaction manager. For example, the TLOG can store a resource checkpoint record, which can be persisted by the transaction manager to enable it to track the different participating XA resources.

A transaction can be written in the TLOG when a transaction manager receives a success vote from all transaction branches after the prepare phase. The transaction record in TLOG can include at least a transaction identifier (XID), which further includes a GTRID assigned by a transaction manager, and a local XID assigned by a resource manager where the transaction is executed.

Furthermore, the TLOG can hold records of the state of in-flight transactions that are marked to be committed. The TLOG is beneficial to recover in-doubt transactions, which are the transactions that have been prepared but have not yet been committed in a mid-tier transactional system, after a system crash. Without recovering the in-doubt transactions, the system can be in an incorrect and inconsistent state after a crash.

For example, if a system fails during a two-phase commit transaction, the updates to one backend data store may have committed, but the updates to another data store, in the same transaction, may not yet have been instructed to commit, i.e.

the data store's updates are still pending. Once the failed parts of the system have been re-started, the data stores holding pending updates may not be able to know whether the updates should be committed or rolled-back.

Figure 3:
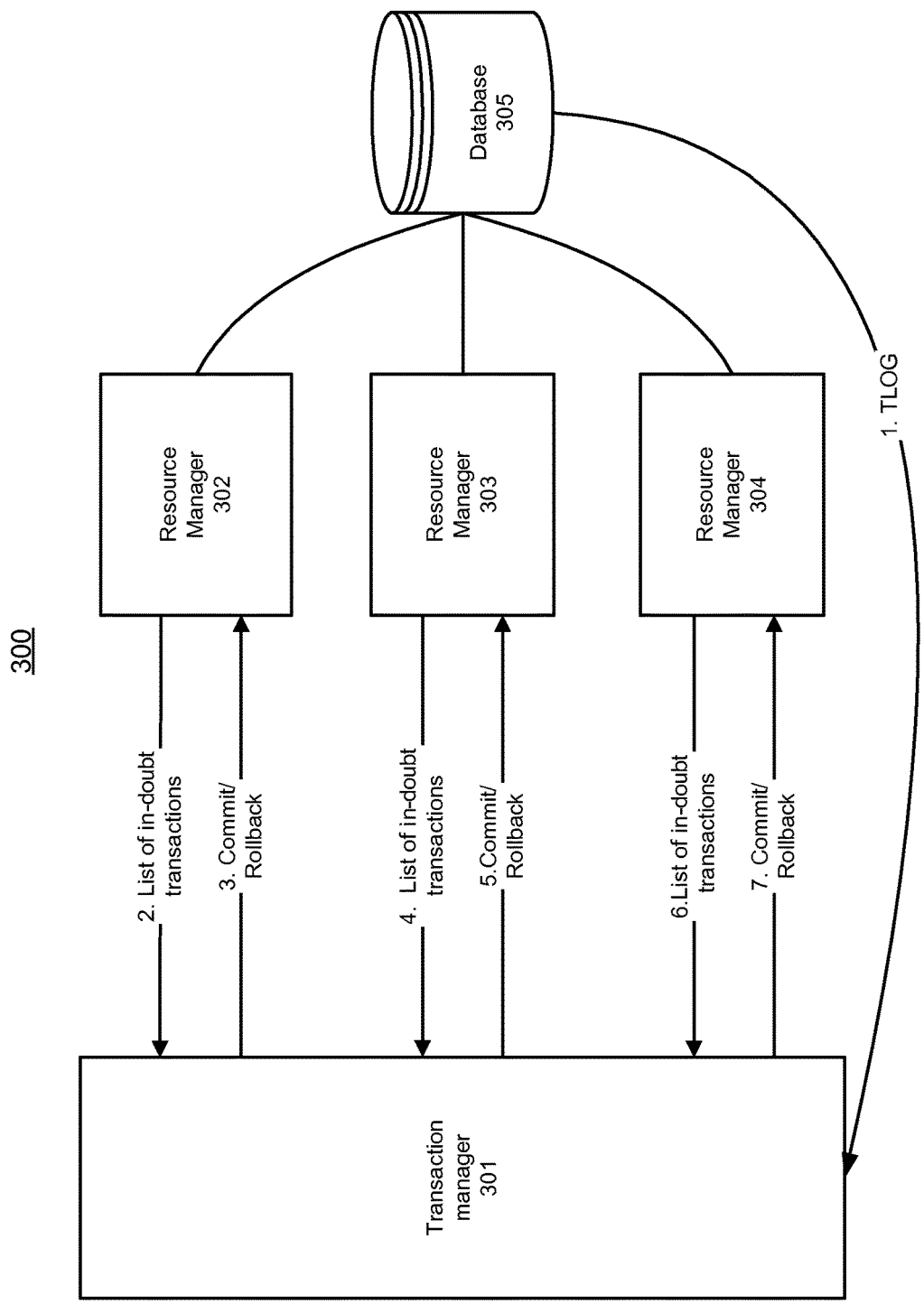
FIG. 3 shows an illustration of recovering in-doubt transactions in a transactional middleware machine environment.

FIG. 3 shows an illustration of recovering in-doubt transactions in a transactional middleware machine environment. As shown in FIG. 3, the transactional middleware machine environment 300 includes a transaction manager 301, and a plurality of resource managers 302-304, and a persistence store, i.e. a database 305.

The transaction manager 301 can automatically determine whether a global transaction is in-doubt, by reading the TLOG (step 1). Then, the transaction manager 301 can poll the relevant backend data stores of the participating resource managers 302-304. Each of the participating resource managers 302-304 can return a list of in-doubt transactions, which are the transactions that the transaction manager 301 does not know whether to roll it back or commit (steps 2, 4 and 6).

Furthermore, the transaction managers 301 can match each in-doubt transaction with the TLOG, and proceed to either commit or roll back the in-doubt transactions on different resource managers 302-304 (steps 3, 5 and 7). For example, when an in-doubt transaction appears in the TLOG, an XAResource.commit( )can be called to commit the in-doubt transaction to a resource manager specified in the TLOG. On the other hand, when a transaction is not in the TLOG, i.e. a commit decision has not been made on the transaction before a crash, an XAResource.rollback( ) can be called to roll it back on a resource manager based on the transaction identifier (XID).

As shown in FIG. 3, a transaction may have been prepared on a resource manager 302 and the system crashes before the resource manager 302 can send the success vote to the transaction manager 301. Then, the transaction manager 301 may not be able to receive a success vote from all transaction branches, and therefore can not log the transaction in the TLOG. Accordingly, the transaction manager 301 can roll back all branch transactions on their respective resource managers 302-304. Thus, using such a consistent and predictable transaction recovery approach, a transaction manager can avoid a mixed heuristic completion where some branches are committed and some are rolled back.

Inline Delegation of Middle-tier Transaction Logs to Database

Figure 4:
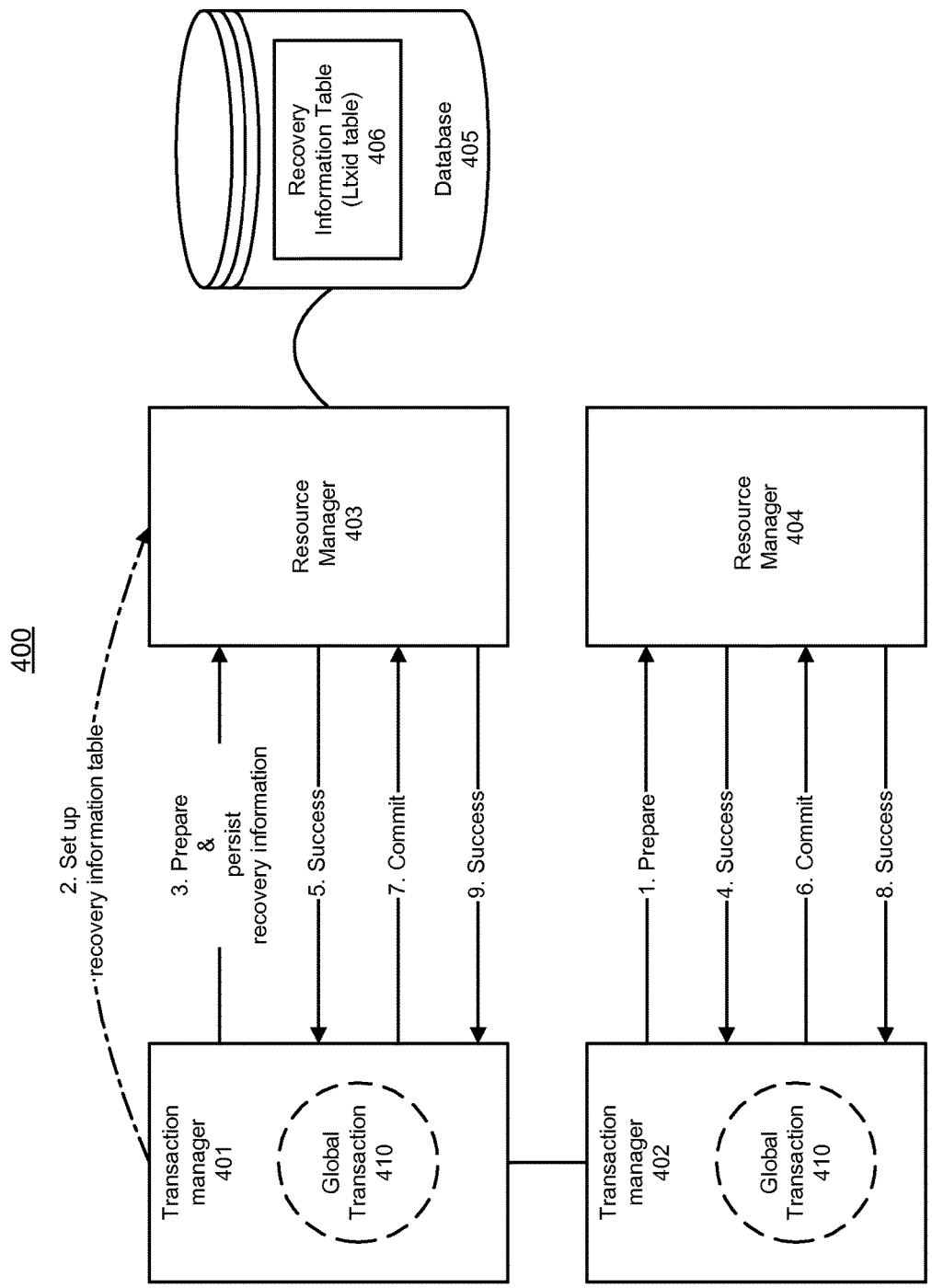
FIG. 4 shows an illustration of supporting inline delegation of transaction logs to a database for processing a transaction in a transactional middleware machine environment, in accordance with an embodiment of the invention.
Figure 7:
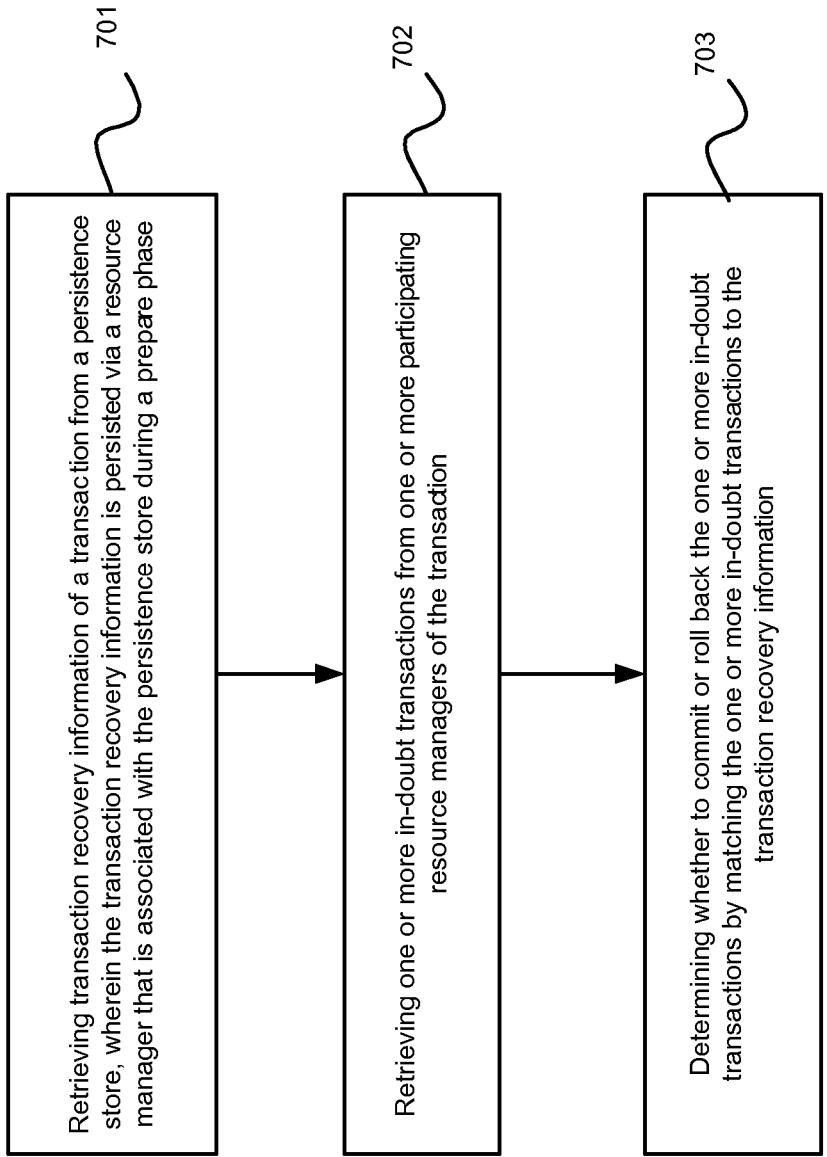
FIG. 7 is an illustrative flow chart of recovering a transaction based on inline delegation of transaction logs to a database, in accordance with an embodiment of the invention.

FIG. 4 shows an illustration of supporting inline delegation of transaction logs to a database for processing a transaction in a transactional middleware machine environment, in accordance with an embodiment of the invention. As shown in FIG. 7, a mid-tier transactional system 400 includes one or more transaction managers (TMs) 401-402, a plurality of resource managers (RMs) 403-404. The resource managers (RMs) 403-404 can participate in a global transaction 410.

Furthermore, a database 405 associated with the resource manager 403, and the database 405 can include a recovery information table 406, e.g. a Ltxid table, for storing transaction recovery information. Additionally, the database 405 can be an instance of a database in a database cluster, which can serve as the persistence store of other resource manager as well, e.g., the resource manager 404.

In accordance with an embodiment of the invention, the transaction 410 can span multiple transaction managers 401-402. As shown in FIG. 4, the system can start the two-phase commit call by triggering the transaction manager 402 to send a prepare request to the XA resources, such as the resource manager 404 (step 1).

Then, the transaction manager 401 can instruct the resource manager 403 to set up the recovery information table 406 in the database 405 (step 2). The transaction manager 401 can set up the recovery information table 406 by calling a function and passing the transaction recovery information as a parameter to the function. For example, the transaction manager 401 can call setClientInfo("SYS_CONTEXT.WLS_LTXID_INFO", ItxidRelatedInfo) on the connection to the database 405, where "ItxidRelatedInfo" is the transaction recovery information, which can include the format identifier, global transaction identifier, and information about other resources enlisted in the transaction. The transaction recovery information can also include other information that is necessary for supporting more complex transaction types.

Furthermore, the transaction manager 401 can prepare the resource manager 403, and can persist the transaction recovery information into the recovery information table 406 (step 3). For example, the persistence of the transaction recovery information can be performed in a single trip to the database 205 during the prepare operation, thus saving a trip to the database 405. The prepare phase is completed after each of the resource managers 403-404 returns a success vote (steps 4 and 5).

The transaction managers 401-402 can forgo persisting transaction records, such as a TLOG, at the end of the prepare phase. Instead, the transaction managers 401-402 can proceed to commit the transaction 410 on the resource manager 404 (step 6), before committing the transaction 410 on the resource manager 403 (step 7). The commit phase is completed after each of the resource managers 403-404 successfully commits the transaction 410 (steps 8 and 9).

In accordance with an embodiment of the invention, the resource manager 403 that is associated with the database 405 can be a local resource manager, i.e. a resource manager that does not implement XA interfaces. The transaction manager 401 can persist the transaction recovery information during the commit operation of the local resource manager, after the completion of the prepare phase on the resource manager 404, and the transaction recovery information can be set up on the local resource manager 403

Figure 5:
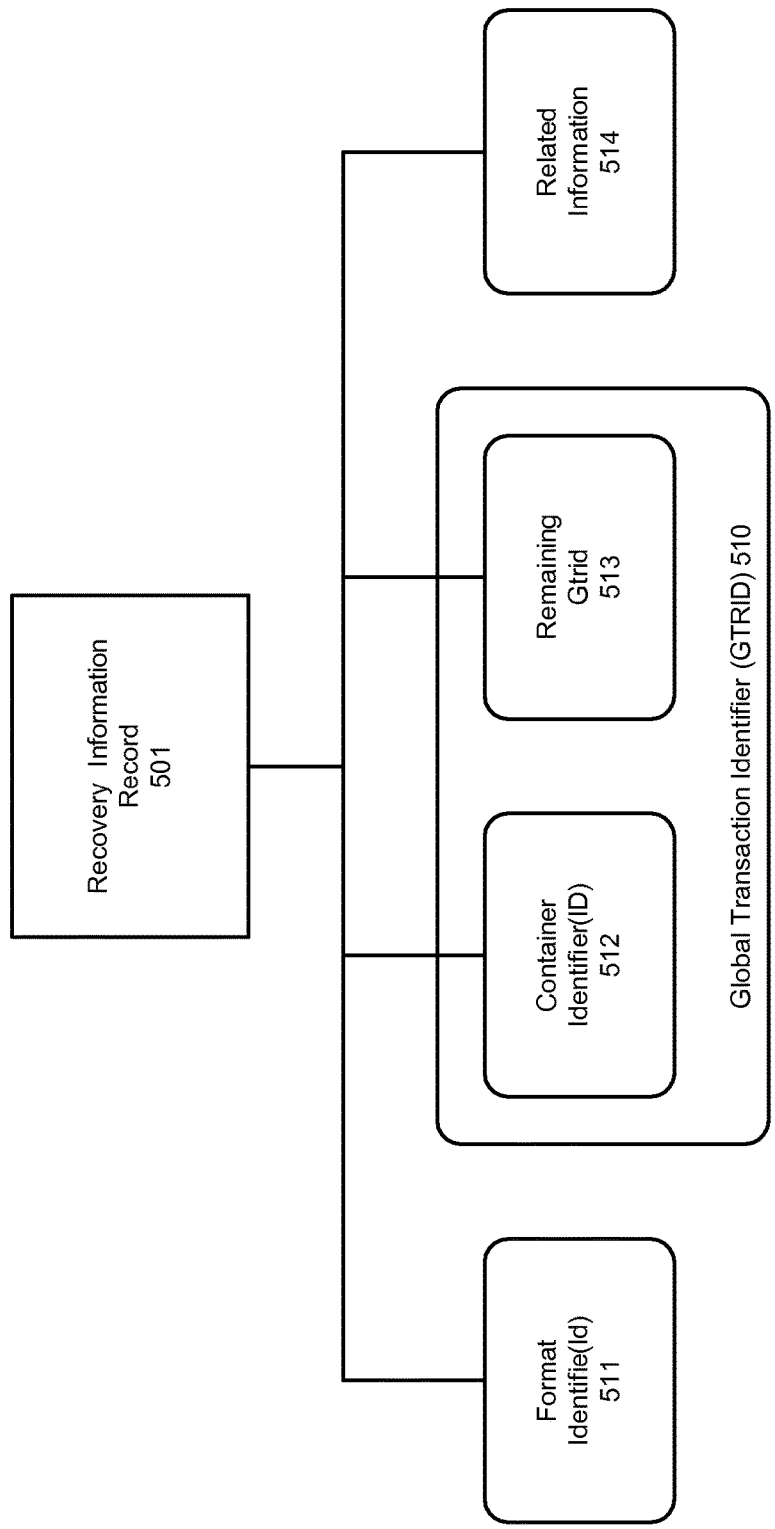
FIG. 5 is an illustration of the contents of the transaction recovery information record, in accordance with one embodiment of the invention.

FIG. 5 is an illustration of the contents of the transaction recovery information record, in accordance with one embodiment of the invention. As shown in FIG. 5, a transaction recovery information record 501, such as a Ltxid table in a database 500, can comprise a global transaction identifier (GTRID) 510, a format identifier section 511, and a related information section 514.

The format identifier section 511 can include a format identifier, which is the unique identifier assigned to vendors by the OpenGroup standard. It can be used to differentiate different products, such as differentiate Tuxedo transactions from WebLogic transactions.

A global transaction identifier (GTRID) can be persisted into the recovery information record 501 as two different fields, which includes a container identifier section 512 and a remaining GTRID section 513. The container identifier section 512 can include a container identifier, which is the unique identifier assigned to a certain group or a managed server in a transaction processing middleware system. For example, the container identifier can be used to identify transactions processed by a group in Tuxedo transaction system or a managed server in WebLogic transaction processing system. The remaining GTRID section 513 contains the remaining bytes of the GTRID.

Thus, the transaction recovery information record 501 can be queried using the global transaction identifier (GTRID), a format identifier (ID) and container identifier (ID). Furthermore, the system can use a list of in-doubt GTRIDs and format identifiers (IDs) from the resource managers as bounding parameter for the returned transaction recovery records.

In accordance with one embodiment of the invention, the recovery information record 501 can be persisted into a redo log of the database 500, or other types of persistence stores.

Transaction Recovery

Figure 6:
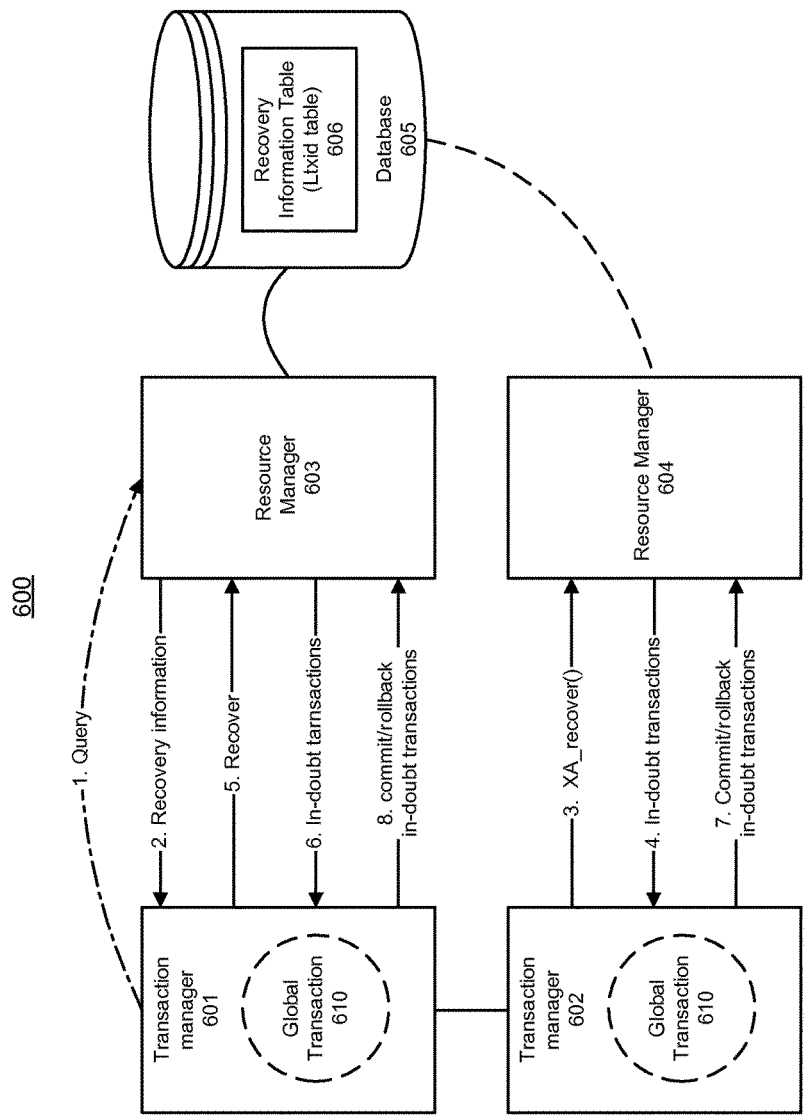
FIG. 6 illustrates a system of recovering a transaction based on inline delegation of transaction logs to a database, in accordance with one embodiment of the invention.

FIG. 6 illustrates a system of recovering a transaction based on inline delegation of transaction logs to a database, in accordance with one embodiment of the invention. As shown in FIG. 6, a mid-tier transactional system 600 comprises one or more transaction managers 601-602. Furthermore, the mid-tier transactional system 600 comprises a plurality of resource managers 603-604, and a database 605 that contains a transaction recovery information table 606.

At the start of the recovery process, the transaction manager 601 can query the resource manager 603, which is associated with the database 605, for the transaction recovery information stored in the recovery information table (LTXID table) 606 (step 1). The transaction manager 401 can continue the recovery process after it receives the queried transaction recovery information from the resource manager 603 (step 2).

As shown in FIG. 6, the transaction manager 602 can perform an XA_recover( )call on each of the XA resource managers, such as the resource manager 604 (step 3). Then, the XA resource manager 604 can return a list of in-doubt transactions, which are the transactions that have been prepared but not committed (step 4).

Furthermore, the transaction manager 602 can match the list of in-doubt transactions against the transaction recovery information records obtained from the database 605, in order to determine whether the in-doubt transactions should be committed or rolled back (step 7). For example, if an in-doubt transaction from the list of in-doubt transactions is matched in the transaction recovery information records, the transaction can be committed; otherwise, it can be rolled back.

Also, the transaction manager 601 can perform recovery on the resource manager 603 (step 5). Accordingly, the resource manager 603 can return a list of in-doubt transactions (step 6). This list of in-doubt transactions can be matched against the transaction recovery information records obtained from the database 605. If an in-doubt transaction from the list of in-doubt transactions is matched in the transaction recovery information records, the transaction can be committed; otherwise, it can be rolled back (step 8).

Alternatively, the transaction managers 601-602 can retrieve the transaction recovery information after they retrieve the lists of in-doubt transactions. Then, the in-doubt transaction lists returned from the resource managers 603-604 can be used as bounding parameters passed into a function to indicate how many records to return.

Additionally, the transaction recovery information in a persistence store can be regularly purged by the database. The transaction recovery records can be purged when their "retention-time" is exceeded. For example, the "retention-time" can be equal or greater than the abandonment timeout set on the transaction processing system. Additionally, the recovery records can be purged when a new local XID is used on a given session. Also, a timer thread in the database server runs at an interval, for example every 30 seconds, to check for such candidates to be purged.

In accordance with one embodiment of the invention, the system can be used to handle complex transactions that span multiple transactional managers, such as the distributed transaction 610 spanning over the transaction managers 603-604.

In an example illustrating a "proprietary" scenario, the transaction manager 601 and the transaction manager 602 can be based on the same product. For example, both transaction managers 601 and 602 can be WebLogic transaction managers, or Tuxedo transaction managers. As shown in FIG. 6, the transaction manager 601 can be the coordinate transaction manager, while the transaction manager 601 can be the subordinate transaction manager in a transaction tree.

In order to recover such a transaction, the transaction manager 601, which can be the root node/server/transaction manager/coordinator, can call down the transaction tree of interposed subordinate(s), which includes the transaction manager 602. Thus, the transaction manager 601 can commit or rollback the transaction 610 on the subordinate(s) as appropriate for each Xid. The subordinate(s), e.g. the transaction manager 602, in turn, can issue these calls on the actual resource managers, e.g. the resource manager 604, to which they have been enlisted.

The subordinate(s), e.g. the transaction manager 602, in this case, may act as resource managers in that they log their own in-doubt records. The root node, e.g. the transaction manager 601, may receive no records from the subordinate(s), e.g. the transaction manager 602, in order to recover the transaction 610 and alleviate the mid-tier transaction logs (TLOGs) for the subordinate(s). For example, a transaction in WebLogic can be recovered without logging additional information by having subordinates query the root LLR records in the database 605 directly, since the system can recognize the subordinates by examining the coordinator identifier (ID) in the GTRID.

In another example illustrating a "proprietary across products" scenario, the transaction manager 601 and the transaction manager 602 can be based on the different products by the same vendor. For example, the transaction manager 601 can be a Tuxedo transaction manager and the transaction manager 602 can be a WebLogic transaction manager, or vice versa. In this case, additional information about the subordinates and/or resources may need to be stored as part of the Xid/commit-record, i.e. the transaction tree can essentially be collapsed into a graph that is stored as part of the commit-record.

In yet another example illustrating a "interop (OTS and WS-AT)" scenario, the transaction manager 601 and the transaction manager 602 can be based on the different products by different vendor, which cannot communicate directly with each other without an interop component. Unlike the previous case, the system can not collapse the full transaction tree and may need to persist these foreign endpoints, which can be in a few kilobytes (kb). Furthermore, the presumed-abort recovery for interop protocols may not be driven by top-down XA recover calls but instead by bottom-up calls from a subordinate node/server/transaction manager/coordinator. For example, the superior endpoints may need to be persisted when the WebLogic and/or Tuxedo transaction managers are the subordinates.

FIG. 7 is an illustrative flow chart of recovering a transaction based on inline delegation of transaction logs to a database, in accordance with an embodiment of the invention. As shown in FIG. 7, at step 701, a transaction manager can retrieve transaction recovery information of a transaction from a persistence store, wherein the transaction recovery information is persisted via a resource manager that is associated with the persistence store during a prepare phase. Furthermore, at step 702, the transaction manager can retrieve one or more in-doubt transactions from one or more participating resource managers of the transaction. Then, at step 703, the transaction manager can determine whether to commit or roll back the one or more in-doubt transactions by matching the one or more in-doubt transactions to the transaction recovery information.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for in-line delegation of transaction logs supporting recovery of a transaction on a plurality of resource managers participating in the transaction in a transactional middleware environment, the method comprising:
    assigning a global transaction identifier (GTRID) to the transaction using a transaction manager, wherein the GTRID is used to identify the transaction which spans said plurality of resource managers participating in the transaction;
    preparing the transaction on the plurality of resource managers participating in the transaction with the transaction manager;
    persisting transaction recovery information for the transaction to a recovery information table of a persistence store associated with one of the plurality of resource managers, wherein said persisting transaction recovery information is performed in a single database transaction during preparing said transaction on said one of the plurality of resource managers whereby the transaction manager can forgo persisting a transaction log after preparing the transaction on all of the plurality of resource managers;
    wherein said transaction recovery information includes said GTRID assigned to the transaction and one or more of: a container identifier, a format identifier, a graph generated by collapsing a transaction tree, or a foreign endpoint;
    retrieving the transaction recovery information including said GTRID from the recovery information table;
    retrieving one or more in-doubt transaction identifiers from the plurality of resource managers participating in the transaction; and
    determining whether to commit or roll back the transaction by matching the one or more in-doubt transaction identifiers to the GTRID in the transaction recovery information stored in the recovery information table of the persistence store associated with said one of the plurality of resource managers, and committing or rolling back the transaction based on said determining.

2. The method of claim 1, further comprising: recovering an in-doubt transaction in the one or more in-doubt transactions by performing one of:
    committing the in-doubt transaction if a match is found in the transaction recovery information; and
    rolling back the in-doubt transaction if no match is found in the transaction recovery information.

3. The method of claim 1, further comprising: setting up a transaction recovery information table via a connection to the persistence store.

4. The method of claim 1, further comprising: persisting the transaction recovery information to the persistence store in a same call that is used to prepare the resource manager that is associated with the persistence store.

5. The method of claim 1, further comprising: periodically deleting the transaction recovery information from the persistence store.

6. The method of claim 1, further comprising: persisting the transaction recovery information to at least one of a normal table of the persistence store and a redo log of the persistence store.

7. The method of claim 1, wherein the transaction recovery information includes information about other participants of the transaction.

8. The method of claim 1, further comprising: querying the persistence store using at least one of: the global transaction identifier (GTRID), the format identifier and the container identifier, and a list of in-doubt GTRIDs and format identifiers from the plurality of resource managers as bounding parameter for the returned transaction recovery information.

9. The method of claim 1, further comprising: spanning the transaction over multiple transaction managers, wherein the transaction managers have different product types.

10. The method of claim 9, further comprising: persisting in said transaction recovery information a graph that is generated by collapsing a transaction tree in the persistence store, or persisting one or more foreign endpoints in the persistence store.

11. A system for in-line delegation of transaction logs supporting recovery of a transaction on a plurality of resource managers participating in the transaction in a transactional middleware environment, the system comprising:
    a computer system comprising a microprocessor and a memory;
    a transaction manager operating on said computer system; and a plurality of resource managers that communicates with the transaction manager in the transactional middleware environment, and wherein the transaction manager and the plurality of resource manager cooperate to perform steps comprising:

assigning a global transaction identifier (GTRID) to the transaction using a transaction manager, wherein the GTRID is used to identify the transaction which spans said plurality of resource managers participating in the transaction;

preparing the transaction on the plurality of resource managers participating in the transaction with the transaction manager;

persisting transaction recovery information for the transaction to a recovery information table of a persistence store associated with one of the plurality of resource managers, wherein said persisting transaction recovery information is performed in a single database transaction during preparing said transaction on said one of the plurality of resource managers whereby the transaction manager can forgo persisting a transaction log after preparing the transaction on all of the plurality of resource managers;

wherein said transaction recovery information includes said GTRID assigned to the transaction and one or more of: a container identifier, a format identifier, a graph generated by collapsing a transaction tree, or a foreign endpoint;

retrieving the transaction recovery information including said GTRID from the recovery information table;

retrieving one or more in-doubt transaction identifiers from the plurality of resource managers participating in the transaction; and determining whether to commit or roll back the transaction by matching the one or more in-doubt transaction identifiers to the GTRID in the transaction recovery information stored in the recovery information table of the persistence store associated with said one of the plurality of resource managers, and committing or rolling back the transaction based on said determining.

12. The system of claim 11, wherein: the transaction manager operates to recover an in-doubt transaction in the one or more in-doubt transactions by performing one of:
  committing the in-doubt transaction if a match is found in the transaction recovery information; and
  rolling back the in-doubt transaction if no match is found in the transaction recovery information.

13. The system of claim 11, wherein: the transaction manager operates to set up the transaction recovery information table via a connection to the persistence store.

14. The system of claim 11, wherein: the transaction manager operates to persist the transaction recovery information to the persistence store in a same call that is used to prepare the resource manager that is associated with the persistence store.

15. The system of claim 11, wherein: the transaction recovery information is periodically deleted from the persistence store.

16. The system of claim 11, wherein: the transaction manager operates to persist the transaction recovery information to at least one of a normal table of the persistence store and a redo log of the persistence store.

17. The system of claim 11, wherein: the transaction recovery information includes the global transaction identifier (GTRID), and a format identifier (ID), and information about other participants of the transaction.

18. The system of claim 11, wherein: the transaction manager operates to query the persistence store using at least one of: the global transaction identifier (GTRID), the format identifier and the container identifier, and a list of in-doubt GTRIDs and format identifiers from the plurality of resource managers as bounding parameter for the returned transaction recovery information.

19. The system of claim 11, wherein: the transaction spans over multiple transaction managers, wherein the multiple transaction managers have different product types, wherein the transaction manager operates to perform one of the steps: persisting a graph that is generated by collapsing a transaction tree in the persistence store as part of the transaction recovery information, and persisting one or more foreign endpoints in the persistence store as part of the transaction recovery information.

20. A non-transitory machine readable storage medium having instructions stored thereon for supporting in-line delegation of transaction logs supporting recovery of a transaction on a plurality of resource managers participating in the transaction in a transactional middleware environment, which instructions, when executed, cause a system to perform steps comprising:

assigning a global transaction identifier (GTRID) to the transaction using a transaction manager, wherein the GTRID is used to identify the transaction which spans said plurality of resource managers participating in the transaction;

preparing the transaction on the plurality of resource managers participating in the transaction with the transaction manager;

persisting transaction recovery information for the transaction to a recovery information table of a persistence store associated with one of the plurality of resource managers, wherein said persisting transaction recovery information is performed in a single database transaction during preparing said transaction on said one of the plurality of resource managers whereby the transaction manager can forgo persisting a transaction log after preparing the transaction on all of the plurality of resource managers;

wherein said transaction recovery information includes said GTRID assigned to the transaction and one or more of: a container identifier, a format identifier, a graph generated by collapsing a transaction tree, or a foreign endpoint;

retrieving the transaction recovery information including said GTRID from the recovery information table;

retrieving one or more in-doubt transaction identifiers from the plurality of resource managers participating in the transaction; and determining whether to commit or roll back the transaction by matching the one or more in-doubt transaction identifiers to the GTRID in the transaction recovery information stored in the recovery information table of the persistence store associated with said one of the plurality of resource managers, and committing or rolling back the transaction based on said determining.

* * * * *

UNITED STATES PATENT AND TRADEMARK OFFICE
CERTIFICATE OF CORRECTION

PATENT NO. : 9,760,584 B2
APPLICATION NO. : 13/828490
DATED : September 12, 2017
INVENTOR(S) : Parkinson et al.

Page 1 of 1

It is certified that error appears in the above-identified patent and that said Letters Patent is hereby corrected as shown below:

On the Title Page

On page 2, Column 1, under U.S. Patent Documents, Line 4, delete "Smith" and insert
-- Smith et al. --, therefor.

In the Drawings

On sheet 1 of 7, in FIGURE 1, Line 6, delete "Exhange" and insert -- Exchange --, therefor.

On sheet 6 of 7, in FIGURE 2, Line 8, delete "tarnsactions" and insert -- transactions --, therefor.

In the Specification

In Column 6, Line 41, after "403" insert -- . --.

Signed and Sealed this
Nineteenth Day of June, 2018

Andrei Iancu
*Director of the United States Patent and Trademark Office*